United States Patent Office 3,485,668
Patented Dec. 23, 1969

3,485,668
METHOD FOR THE REMOVAL OF FATTY ACIDS FROM STARCHES
Walter G. Kunze, Catonsville, Md., assignor to National Starch and Chemical Corporation, New York, N.Y., a corporation of Delaware
No Drawing. Filed Apr. 5, 1967, Ser. No. 628,543
Int. Cl. C13l 1/00
U.S. Cl. 127—71                    4 Claims

ABSTRACT OF THE DISCLOSURE

A method for effecting the extraction of substantially all of the fatty acid content of fatty acid-containing starches. More specifically, an extraction procedure which is conducted at reflux temperatures and atmospheric pressure and which utilizes a solvent system comprising a mixture of dimethyl sulfoxide and a hydrophilic, fatty acid solvent in order to accomplish the desired fatty acid removal. The resulting defatted starches may, thereafter, be effectively used in food, adhesive and film-forming applications.

---

It has long been known that the starches derived from certain plant sources contain fatty acids which are not chemically combined with the starch but which are, instead, intimately physically bound into the starch granule. The extraction of these fatty acids proves to be rather difficult inasmuch as they are inaccessible to the mechanical or phyical purification methods utilized during the refining of the starch as well as to subsequent solvent extraction procedures wherein, for example, typical hydrocarbon solvents may be used. These fatty acids consist, primarily, of palmitic, stearic, oleic and linoleic acids. Typical concentrations of fatty acids present in various starches are, for example, about 0.65%, by weight, in corn starch and as much as about 1%, by weight, in certain high amylose starches, i.e. starches resulting from specialized breeding techniques designed to substantially increase their amylose content over the normal concentration of about 27%, by weight. The presence of these fatty acids has a considerable bearing on the rheological behavior of the starches as well as on the derivatives and conversion products derived therefrom. Since proper rheological properties are of considerable importance when starches are utilized in the preparation of foods and adhesives, the removal of these fatty acids as means for enhancing their rheological properties is, therefore, highly desirable. The absence of fatty acids also enables the resulting starches, and particularly the high amylose variety, to exhibit excellent film-forming properties.

Known methods for extracting fatty acids from starches have generally utilized hydrophilic solvents which are capable of penetrating the interior of the highly hydrophilic and tightly bound starch granules and, thereby, leaching out the fatty acids present therein. Thus, these prior art methods have involved solvent extraction of the starch by refluxing, at atmospheric pressure, with such solvents as methanol, dioxane, methyl cellosolve and diethyl amine. These procedures have not, however, provided effective fatty acid removal since they require prolonged and repeated refluxing in order to remove a substantial portion of the fatty acid content.

In an attempt to overcome these disadvantages, the above described extraction procedures have also been conducted at elevated temperatures and pressures. Although the latter techniques have improved both the speed and the efficiency of the extraction, the necessary presence of water in such high temperature, high pressure reactions has the undesirable effect of producing physico-chemical or morphological changes in the granule so that the resulting starch, while nearly free of fatty acids, displays severe rheological changes which limit the applications in which such starches can be employed. Furthermore, the use of high temperatures and pressures necessitates the installation of expensive high pressure equipment in order to protect against the dangers inherent in the utilization of explosive and/or flammable solvents under such conditions.

It is, thus, the object of this invention to provide a method capable of providing for the efficient and rapid extraction of fatty acids from starches at atmospheric pressure and without adversely affecting the rheological properties of the starches thus treated. Various other objects and advantages of this invention will become apparent to the practitioner from the following description thereof.

I have now discovered a method for removing fatty acids from starches, said method being rapidly and efficiently conducted at atmospheric pressure and without effecting any detrimental changes in the rheological properties of the starch. Thus, the novel process of this invention utilizes solvent systems comprising a mixture of dimethyl sulfoxide with a co-solvent which is completely water miscible, i.e. a hydrophilic solvent, and which, in addition, is capable of dissolving at least about an equal weight, with respect to said hydrophilic solvent, of linoleic acid in a procedure which is conducted at atmospheric pressure and at the reflux temperature of the selected solvent system. The use of the thus specified solvent system thereby enables the practitioner to overcome the various disadvantages inherent in the above described prior art extraction procedures.

For purposes of this disclosure, the use of the terms "starch" or "starches" is meant to denote fatty acid-containing raw starches as well as fatty acid-containing, raw, high amylose starches containing at least about 50%, by weight, of amylose. Both the latter classes of starches may be derived from such plant sources as corn, tapioca, wheat and rice, etc. Also included are the conversion products derived from any of the latter classes of starch including, for example, fluidity or thin boiling starches prepared by enzyme conversion or mild acid hydrolysis as well as any substituted ether or ester derivatives thereof.

It should also be noted that starch-containing meals and flours derived from the above listed raw starch sources are viewed, for purposes of this invention, as fully equivalent to starch and, therefore, readily utilizable in the fatty acid extraction procedure of this invention.

As previously noted, the applicable solvent systems for use in this novel process are comprised of mixtures of dimethyl sulfoxide and a hydrophilic solvent which is capable of dissolving at least about an equal weight, with respect to said hydrophilic solvent, of linoleic acid. Applicable hydrophilic solvents will thus include, for example, lower aliphatic alcohols, i.e. aliphatic alcohols containing from 1 to 3 carbon atoms such as methanol, ethanol, n-propanol and isopropanol, and acetone and 1,4-dioxane. It should be noted that the choice of linoleic acid as the fatty acid solubility standard for the co-solvent is not intended to emphasize the importance in starch of this particular acid but merely to provide a convenient, albeit arbitrary, standard to be utilized in determining the fatty acid solubility of the co-solvents applicable for use in this process.

These solvent mixtures exhibit unexpected ease in their ability to penetrate the starch granule and to extract the fatty acids from the tightly bound crystalline areas wherein they are complexed. Although the exact mechanism of this extraction procedure is not completely understood, both components of the specified solvent system have been found to be essential thereto. Thus, the use of a solvent system which contains only the hydrophilic solvent, fails to provide the intense degree of granule penetration and extractive capacity which is required in order to fulfill the desired objectives of this invention. In addition, the utilization of a solvent system containing only dimethyl sulfoxide would result in the dissolution of the starch during the refluxing procedure; the presence of the hydrophilic solvent therein thus serving to prevent the occurrence of this undesirable phenomenon.

Although dimethyl sulfoxide is the preferred primary solvent for use in the novel extraction procedure of this invention, it should be noted that other sulfoxides such as dibutyl and diethyl sulfoxides may, if desired, be substituted therefor.

With regard to proportions, the selected solvent system should contain from about 30 to 70%, by weight, of dimethyl sulfoxide, while within the latter limits, it should be noted that the use of higher concentrations of dimethyl sulfoxide will result in proportionate increases in the extraction efficiency of the system. Thus, the use of solvent blends containing appreciably more than about 70%, by weight, of dimethyl sulfoxide will cause swelling and cooking of the starch, while the use of blends containing less than about 30%, by weight, of dimethyl sulfoxide will not provide the high degree of efficient fatty acid extraction that is desired in the process of this invention. It should be noted, however, that the nature of the co-solvent as well as of the fatty acid-containing starch will largely determine the concentration of dimethyl sulfoxide that can be tolerated without resulting in the undesirable cooking and swelling of the starch. Thus, although a 70%, by weight, concentration of dimethyl sulfoxide has been established as the approximate maximum concentration for use in our novel process, it is incumbent upon the practitioner to examine the specific system which he is utilizing in order to determine the precise maximum concentration of dimethyl sulfoxide which it will safely tolerate. For example, the use of solvent systems containing 1,4 dioxane as the co-solvent will swell the starches undergoing extraction when the concentration of the dimethyl sulfoxide substantially exceeds a value of about 40%, by weight. Likewise, the various fatty acid-containing starches and their modifications differ as to the maximum amount of dimethyl sulfoxide which they can tolerate without exhibiting undue swelling.

In addition, it is advisable that the selected solvent blend be present in a concentration of from about 2 to 10 parts, by weight, and preferably in a concentration of about 5 parts, by weight, for each part, by weight, of the dry starch whose extraction is desired.

In general, the extraction procedure of this invention involves merely admixing the starch with the solvent blend and, thereupon, slowly heating the resulting mixture to the reflux temperature of the system. It should be noted that the major portion of the fatty acid content of the starch is extracted during this initial heating period. However, in order to attain the highest possible degree of efficiency, the heating is not terminated at this juncture, rather the mixture is allowed to reflux for an additional period of from about 15 to 120 minutes. The reflux temperature of the system will, of course, depend on the specific solvent blend which is being used. Thus, temperatures in the range of from about 140 to 250° F. will generally be employed. The resulting defatted starch product is then filtered, washed in methanol and/or water to remove the dimethyl sulfoxide and, finally, dried. Needless to say, the above described procedure may be repeated as many times as is desired, although it should be noted that the use of a single extraction cycle will, under optimum conditions, provide an extraction efficiency in excess of about 90% of the fatty acid originally present in the starch.

The resulting defatted starches are found to exhibit many properties which are extremely advantageous in their subsequent utilization. Thus, for example, aqueous pastes prepared with defatted corn starches exhibit distinctly lower viscosities and rapidly set up noticeably harder gels as compared with pastes derived from unextracted corn starches. The latter properties are of great value in paper and textile sizing wherein it is desirous that the sizing formulations containing high concentrations of solids and, in the case of textile sizes, that they rapidly set to form hard films. Furthermore, when defatted high amylose starches are cooked under pressure in the presence of a plasticizer, they are found to be more fluid and less apt to congeal into thixotropic, heavy bodied materials. This characteristic greatly facilitates the use of such high amylose cooks in dipping and coating techniques. Thus, when defatted high amylose starches are utilized in the manufacture of films, it has been found that the resulting films exhibit higher tensile strength higher elongation, greater clarity, higher fold strength and a reduced need for plasticization as compared with the films derived from unextracted high amylose starches.

In the following examples, which further illustrate the embodiment of this invention, all parts given are by weight unless otherwise specified.

EXAMPLE I

This example illustrates the extraction of fatty acids from corn starch by means of the novel process of this invention.

The following ingredients were charged into a reaction vessel equipped with a reflux condenser and means for mechanical agitation.

| | Parts |
|---|---|
| Air dried raw corn starch | 56 |
| Dimethyl sulfoxide | 150 |
| Methanol | 100 |

The resulting mixture was heated to its reflux temperature of 184° F. over a period of about 10 minutes, whereupon refluxing was allowed to proceed for an additional period of 30 minutes. The defatted starch product was then filtered, washed three times with methanol, and dried.

In order to determine the efficiency of the latter procedure, samples of the fatty acid-containing raw corn starch as well as of the extracted starch product at various stages of the extraction procedure were submitted to an acid hydrolysis procedure. The results of these determinations are presented in the following table:

| Heating period (min.) | Fatty acid content (percent by weight) | Extraction efficiency (percent) |
|---|---|---|
| 0 | 0.65 | |
| 10 | 0.075 | 88.5 |
| 25 (15 minute reflux) | 0.051 | 92.2 |
| 40 (25 minute reflux) | 0.042 | 93.5 |

The data summarized hereinabove indicates the excellent extraction efficiency resulting from the process of this invention. It further indicates that the initial, short heating period is sufficient in order to extract a major portion of the fatty acid content.

EXAMPLE II

This example further illustrates the extraction procedure of this invention utilizing, in this instance, a variety of different starches, solvent systems and reaction conditions.

The fatty acid-containing starches of this example were extracted by means of the general procedure set forth in Example I, hereinabove. The specific reagents and reaction conditions which were utilized are presented in the following table:

fatty acids from starches. Variations may be made in proportions, procedures and materials without departing

| Reagents | Parts Product No. | | | | | | | | |
|---|---|---|---|---|---|---|---|---|---|
| | 1 | 2 | 3 | 4 | 5 | 6 | 7 | 8 | 9 |
| An air dried raw, high amylose corn starch containing about 60% by weight of amylose | 100 | | 56 | | | 56 | 56 | | |
| An air dried, raw, high amylose corn starch containing about 70% by weight of amylose | | | | | 56 | | | | |
| An air dried acetate ester of a high amylose corn starch resulting from the treatment of a high amylose corn starch containing about 55%, by weight, of amylose with 5% by weight of acetic anhydride | | | | | | 56 | | | |
| An air dried raw corn starch | | 56 | | | | | | 56 | 56 |
| Dimethyl sulfoxide | 200 | 150 | 150 | 150 | 150 | 60 | 150 | 150 | 100 |
| Methanol | 200 | 150 | 100 | 100 | 100 | | | | |
| A 90%, by weight, aqueous solution of ethanol | | | | | | 90 | | | |
| Isopropanol | | | | | | | 100 | | |
| Acetone | | | | | | | | 100 | |
| 1,4 dioxane | | | | | | | | | 150 |

| | Reaction conditions and performance data | | | | | | | | |
|---|---|---|---|---|---|---|---|---|---|
| Reflux temperature (°F.) | 174 | 184 | 184 | 184 | 182 | 187 | 219 | 166 | 228 |
| Reflux time (minutes) | 60 | 60 | 60 | 60 | 30 | 120 | 30 | 14 | 60 |
| Fatty acid concentration prior to extraction (percent by weight) | 0.90 | 0.65 | 0.90 | 1.10 | 0.65 | 0.90 | 0.90 | 0.65 | 0.65 |
| Fatty acid concentration after extraction (percent by weight) | 0.05 | 0.04 | 0.06 | 0.06 | 0.03 | 0.09 | 0.07 | 0.062 | 0.04 |
| Extraction efficiency (percent) | 94.4 | 93.9 | 93.3 | 94.5 | 95.4 | 90.0 | 92.2 | 90.5 | 93.9 |

The results summarized above clearly indicate the effectiveness of the extraction process of this invention when utilized to extract fatty acids from a variety of starches. They also indicate the applicability, to the process of this invention, of different solvent systems under varied extraction conditions.

EXAMPLE III

This example illustrates the advantages derived from the use of the novel process of this invention when compared with a typical prior art extraction procedure.

A sample of the identical raw corn starch which had been extracted with a dimethyl sulfoxide-methanol solvent system as described in Example I, hereinabove, was now extracted, by refluxing with a 90%, by weight, aqueous methanol solution; said methanol extraction procedure being a preferred prior art extraction technique. The extraction conditions which were utilized as well as the amounts of fatty acid extracted are presented in the following table:

| | Dimethyl sulfoxide-methanol extraction | Methanol extraction |
|---|---|---|
| Reflux temperature (°F.) | 184 | 155 |
| Initial fatty acid content (percent by wt.) | 0.65 | 0.65 |
| Fatty acid content after a 10 minute heating period (percent by weight) | 0.075 | |
| Fatty acid content after 15 minutes of reflux (percent by weight) | 0.051 | |
| Fatty acid content after 30 minutes of reflux (percent by weight) | 0.042 | 0.36 |
| Fatty acid content after 60 minutes of reflux (percent by weight) | 0.040 | [1] 0.29 |
| Fatty acid content after 120 minutes of reflux (percent by weight) | 0.030 | [2] 0.22 |

[1] The reflux period was divided into two 30 minute cycles wherein a fresh supply of solvent was employed for each cycle.
[2] The reflux period was divided into two 60 minute cycles wherein fresh supply of solvent was employed for each cycle.

The results summarized above clearly indicate the superior extraction efficiency of the novel process of this invention.

Summarizing, it is thus seen that this invention provides a novel process for the rapid, efficient extraction of fatty acids from the scope of this invention which is defined by the following claims.

I claim:
1. A method for the removal of fatty acids from a fatty acid-containing starch, said method comprising the steps of: (1) admixing a fatty acid-containing starch with a solvent system consisting essentially of a mixture of dimethyl sulfoxide and a hydrophilic solvent which is capable of dissolving at least about an equal weight, with respect to said hydrophilic solvent, of linoleic acid; (2) heating the resulting starch-solvent mixture at an elevated temperature not exceeding the reflux temperature of said solvent system; and, (3) thereafter recovering the resulting defatted starch product.

2. The method of claim 1, wherein said solvent system is present in a concentration of from about 2 to 10 parts, by weight, for each part, by weight, of dry fatty acid-containing starch.

3. The method of claim 1, wherein said dimethyl sulfoxide is present in said solvent system in a concentration of from about 30 to 70%, by weight.

4. The method of claim 1, wherein said hydrophilic solvent is selected from the group consisting of methanol, ethanol, n-propanol, isopropanol, acetone and 1,4-dioxane.

References Cited

UNITED STATES PATENTS 2,280,723  4/1942  Schoch _____ 127—71
2,587,650  3/1952  Rist et al. _____ 127—71

OTHER REFERENCES

T. J. Schoch, "Methods in Carbohydrate Chemistry," IV, R. L. Whistler, ed., pp. 56–59, Academic Press, New York, 1964.

R. Gracza, "Starch: Chemistry and Technology," I, R. L. Whistler, ed., pp. 107–110, 440–442, Academic Press, New York, 1965.

JOSEPH SCOVRONEK, Primary Examiner

S. MARANTZ, Assistant Examiner

U.S. Cl. X.R.

127—32